(12) United States Patent
Marquardt et al.

(10) Patent No.: US 10,157,594 B2
(45) Date of Patent: Dec. 18, 2018

(54) LAYERED CONTENT DISPLAY SYSTEM

(71) Applicant: Dell Products L.P., Round Rock, TX (US)

(72) Inventors: Joseph Paul Marquardt, Menlo Park, CA (US); Sean Patrick O'Neal, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 93 days.

(21) Appl. No.: 15/244,895

(22) Filed: Aug. 23, 2016

(65) Prior Publication Data

US 2018/0061375 A1    Mar. 1, 2018

(51) Int. Cl.
*G09G 5/377* (2006.01)
*G06T 1/20* (2006.01)
*G06F 3/14* (2006.01)
*G06F 3/0486* (2013.01)
*G06F 17/28* (2006.01)
*G06F 3/0488* (2013.01)
*G06F 3/0485* (2013.01)
*G06F 3/0484* (2013.01)
*G06F 3/0482* (2013.01)
*G09G 5/02* (2006.01)
(Continued)

(52) U.S. Cl.
CPC .......... *G09G 5/377* (2013.01); *G06F 3/0482* (2013.01); *G06F 3/0485* (2013.01); *G06F 3/0486* (2013.01); *G06F 3/04845* (2013.01); *G06F 3/04883* (2013.01); *G06F 3/1423* (2013.01); *G06F 3/1454* (2013.01); *G06F 17/28* (2013.01); *G09G 5/022* (2013.01); *G09G 5/14* (2013.01); *G09G 2340/125* (2013.01); *G09G 2370/02* (2013.01); *H04L 67/1074* (2013.01); *H04W 84/12* (2013.01)

(58) Field of Classification Search
CPC ..... G09G 5/377; G06F 3/1454; G06F 3/0486; G06F 3/04842; G06T 1/20; H04L 65/4015; H04L 67/10; H04L 67/42
USPC ........ 345/629; 715/733, 747, 751, 764, 765, 715/769, 802
See application file for complete search history.

(56) References Cited

U.S. PATENT DOCUMENTS

2006/0136828 A1 * 6/2006 Asano .................. G06F 3/1454
715/733
2012/0084713 A1 * 4/2012 Desai ..................... G06F 9/452
715/788
(Continued)

*Primary Examiner* — Jin-Cheng Wang
(74) *Attorney, Agent, or Firm* — Haynes and Boone, LLP

(57) ABSTRACT

A layered content display system includes a networking device coupled to a network, a source device configured to display first content information on a source device screen, a display device, and a sink device coupled to the networking device, the source device, and the display device. The sink device receives an identification of the first content information from the source device. The sink device then retrieves a first subset of the first content information from the source device, and a second subset of the first content information from the network through the networking device. The sink device then provides the second subset of the first content information layered with the first subset of the first content information for display on the display device such that the first content information displayed on the display device is substantially similar to the first content information displayed on the source device screen.

20 Claims, 10 Drawing Sheets

(51) Int. Cl.
*G09G 5/14* (2006.01)
*H04W 84/12* (2009.01)
*H04L 29/08* (2006.01)

(56) References Cited

U.S. PATENT DOCUMENTS

| | | | |
|---|---|---|---|
| 2012/0096397 A1* | 4/2012 | Ording | G06F 3/04883 |
| | | | 715/802 |
| 2012/0304077 A1* | 11/2012 | Hornback, Jr. | G06F 3/1454 |
| | | | 715/753 |
| 2013/0159874 A1* | 6/2013 | Bhogal | G06F 3/1454 |
| | | | 715/747 |
| 2015/0095802 A1* | 4/2015 | Huang | H04L 65/403 |
| | | | 715/753 |
| 2015/0180930 A1* | 6/2015 | Sun | H04L 67/104 |
| | | | 709/203 |
| 2015/0309689 A1* | 10/2015 | Jin | G06F 3/04817 |
| | | | 715/765 |
| 2017/0024100 A1* | 1/2017 | Pieper | G06F 3/0486 |

* cited by examiner

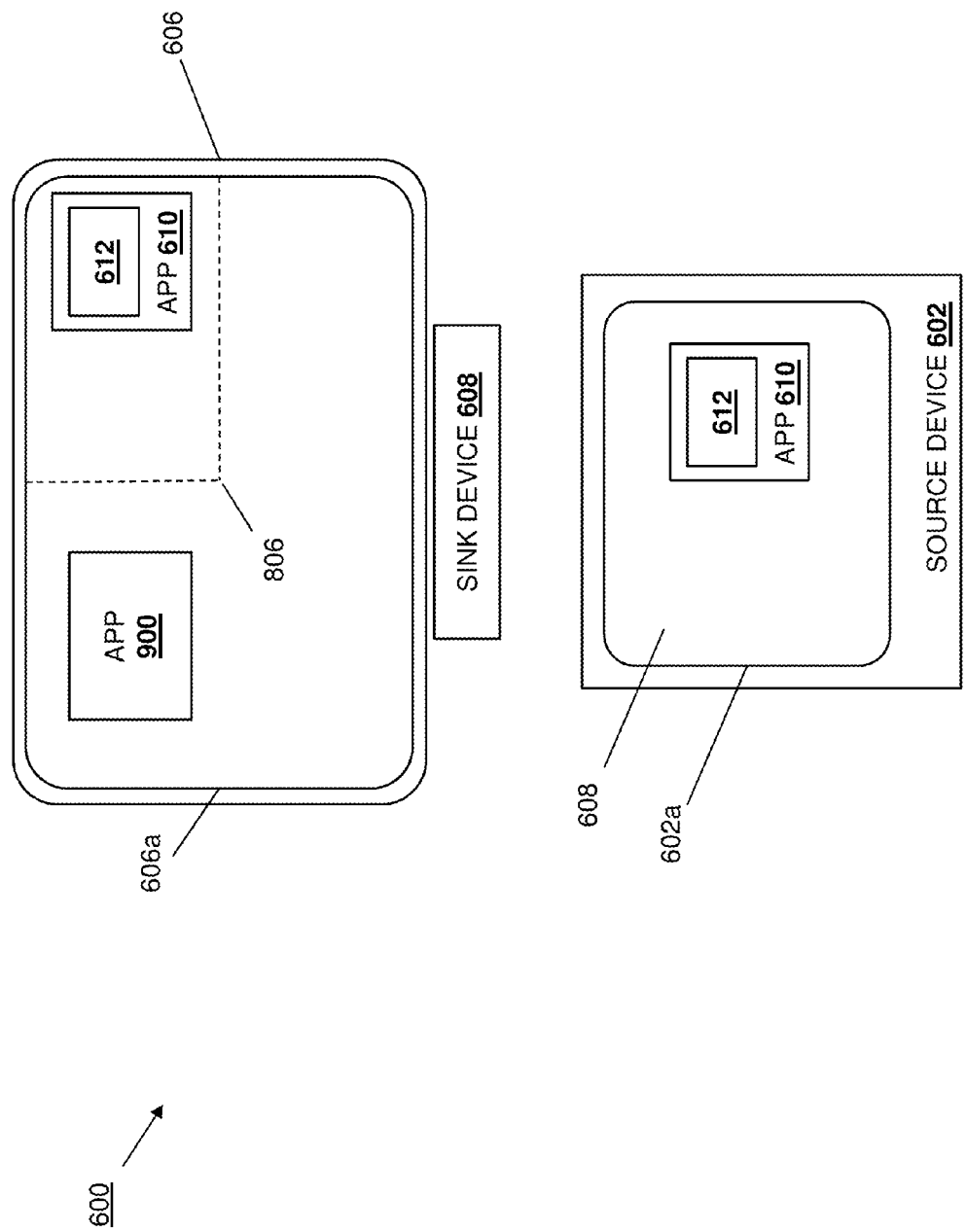

US 10,157,594 B2

LAYERED CONTENT DISPLAY SYSTEM

BACKGROUND

The present disclosure relates generally to information handling systems, and more particularly to a system for displaying layered content retrieved via different communication channels as instructed by one or more information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are often utilized for the provisioning and display of content. For example, source devices such as, for example, laptop/notebook computing devices, tablet computing devices, and/or mobile phones, may identify content to sink devices such as, for example, projector systems, display systems (e.g., televisions), dongle systems, and/or content management systems, in order to have those sink devices provide that content for display on a display device (e.g., a display screen of the projector, a connected or integrated display device, etc.) However, providing for the display of bandwidth intensive content (e.g., particularly media content at high resolutions and full color depth) in such a manner can create high latency in wireless display connections due to the significant amount of content information (e.g., pixel information) that must be transmitted through the system, which can cause noticeable delays in the response of content information such as, for example, input elements (e.g., mouse pointers). For example, when the content information includes information retrieved from a network (e.g., the Internet) by the source device, such content information is retrieved from the network to an access point, transmitted wirelessly from the access point to the source device, and them transmitted from the source device to the sink device for display. The latency issues associated with the use of wireless connection systems (e.g., WiFi systems) for transmittal of the content information raises issues with the use of those wireless connection systems that can further result in visual artifacts and interrupted service that impact the user experience. Furthermore, source devices may experience link failures when attempting to maintain multiple links (e.g., a Wifi link to an access point that connects to the Internet, along with a peer-to-peer link to the sink device).

Accordingly, it would be desirable to provide an improved content display system.

SUMMARY

According to one embodiment, an information handling system (IHS) includes a communication system; a processing system that is coupled to the processing system; and a memory system that is coupled to the processing system and that includes instructions that, when executed by the processing system, cause the processing system to provide a display engine that is configured to: receive, from a source device, an identification of first content information; retrieve, from the source device, a first subset of the first content information; retrieve, through a network, a second subset of the first content information; and provide, for display on a display device, the second subset of the first content information layered with the first subset of the first content information such that the display of the first content information on the display device is substantially similar to the display of the first content information on the source device.

BRIEF DESCRIPTION OF THE DRAWINGS

FIG. 9 is a schematic view illustrating an embodiment of the sink device displaying additional content information from a source device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
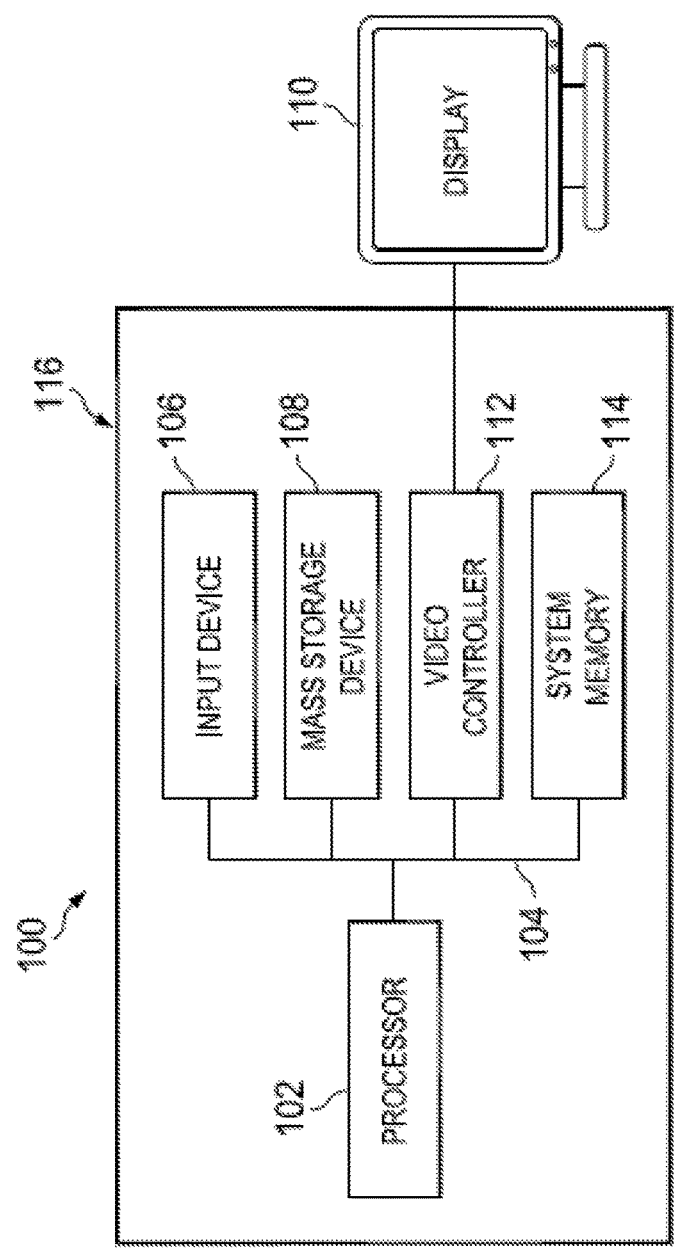
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
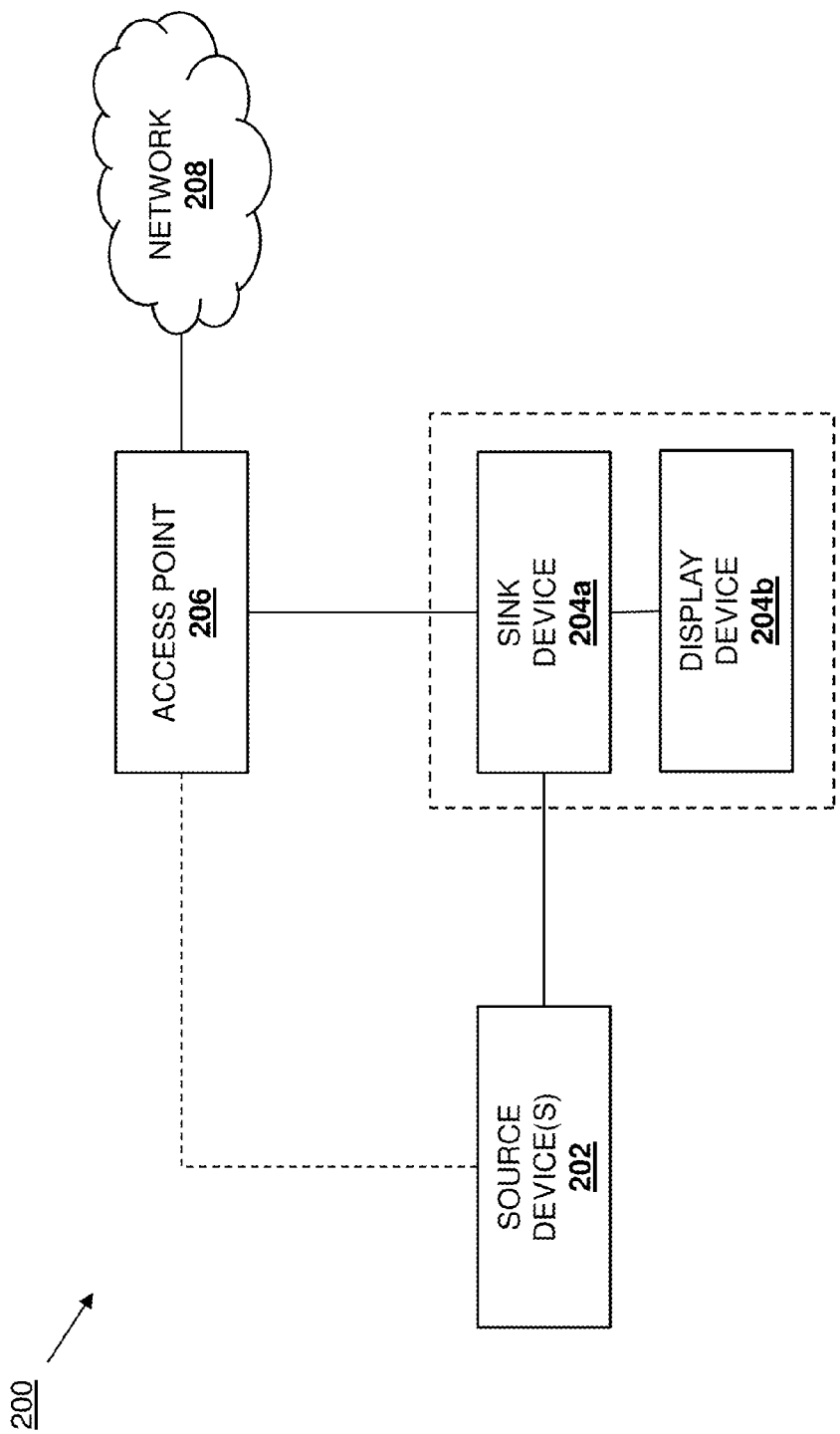
FIG. 2 is a schematic view illustrating an embodiment of a layered content display system.

Referring now to FIG. 2, an embodiment of a layered content display system 200 is illustrated that includes one or more source devices 202. In an embodiment, any or all of the source device(s) 202 may be the IHS 100 discussed above with reference to FIG. 1, and/or may include some or all of the components of the IHS 100. In the examples discussed below, the source device(s) 202 are described as mobile computing devices such as laptop/notebook computer devices, tablet computing devices, and mobile phones. However, in other embodiments, the source device(s) 202 may be provided by desktop computing devices, server computing devices, and/or a variety of other computing devices that would be apparent to one of skill in the art in possession of the present disclosure. Each of the plurality of source device(s) 202 are coupled to a sink device 204a. In an embodiment, the sink device 204a may be the IHS 100 discussed above with reference to FIG. 1, and/or may include some or all of the components of the IHS 100. In the examples discussed below, the sink device 204a is described as a shared display system that may include a projector computing system, a dongle computing system (e.g., including a GOOGLE® CHROMECAST® dongle computing device, an AMAZON® FIRE TV STICK® dongle computing device, etc.), a television display system, a content management display system (e.g., including an APPLE TV® content management system), and other shared display systems know in the art. However, in other embodiments, the sink device 204a may be provided by a variety of other computing devices that include display screens that may be utilized by the source device(s) 202 as would be apparent to one of skill in the art in possession of the present disclosure.

In an embodiment, the coupling between the source device(s) 202 and the sink device 204a is a communicative coupling that provides for the transmission of content information and other data between each of the source device(s) 202 and the sink device 204a for display. In the examples discussed below, the couplings between the source device(s) 202 and the sink device 204a are described as wireless couplings provided by wireless communication subsystems that may include WiFi communication subsystems, BLUETOOTH® communication subsystems, and/or other wireless communication subsystems known in the art. However, in other embodiments, the couplings between any or all of the source device(s) 202 and the sink device may be provided by wired connections, combined wireless/wired connections, and/or any other coupling that is configured to transmit the data as discussed below. As discussed below, the coupling between any source device 202 and the sink device 204a may include one or more wired communication channels, and/or one or more wireless communication channels such as, for example, a WiFi communication channel, a Peer-To-Peer (P2P) communication channel (e.g., a BLUETOOTH® communication channel or Near Field Communication (NFC) channel) and/or any of a variety of other wireless communication channels known in the art.

The sink device 204a is coupled to a display device 204b. In some embodiments, the sink device 204a and the display device 204b may be separate components such as, for example, the projector computing device/sink device and projector screen/display device, the dongle computing device/sink device and display device, and/or the content management computing device/sink device and display device described herein. However, in other embodiments, the sink device 204a and the display device 204b may be an integrated component (as illustrated by the dashed line in FIG. 2) such as, for example, the television display device and/or other computing devices described herein. As such, the coupling between the sink device 204a and the display device 204b that is illustrated in FIG. 2 need not be a physical coupling, but rather may be provided by positioning the sink device 204a appropriately relative to the display device 204b (e.g., as with a projector computing device/sink device positioned appropriately to provide images on a projector screen/display device). However, in some embodiments, the coupling between the sink device 204a and the display device 204b that is illustrated in FIG. 2 may be a physical external coupling such as a cable between the sink device 204a and the display device 204b (as is used with content management display systems), or a mated connection between the sink device 204a and the display device 204b (as is used with dongle computing systems). Furthermore, in some embodiments, the coupling between the sink device 204a and the display device 204b that is illustrated in FIG. 2 may be a physical internal coupling such as a coupling provided between a processing system and a display subsystem in a television display device and/or other computing device.

In the illustrated embodiment, the sink device 204a is coupled to an access point 206 that is further coupled to a network 208. In an embodiment, the access point 206 may be the IHS 100 discussed above with reference to FIG. 1, and/or may include some or all of the components of the IHS 100. In the examples discussed below, the access point 206 is described as a wireless access point that may be connected to or integrated in a router device. However, in other embodiments, the access point 206 may be provided by any networking device (wired or wireless) that provides for a connection to the network 208. While the network 208 is described in many of the examples below as the Internet, in some embodiments the network 208 may include a Local Area Network (LAN) or other network known in the art as well. As discussed below, the coupling between the sink device 204a and the access point 206 may include one or more wired communication channels, and/or one or more wireless communication channels such as, for example, a WiFi communication channel, a Peer-To-Peer (P2P) communication channel (e.g., a BLUETOOTH® communication channel or Near Field Communication (NFC) channel), and/or any of a variety of other communication channels known in the art. However, in some embodiments, the access point 206 may be omitted such that the layered content display system 200 includes source device(s) 202 coupled to the sink device 204a and display device 204b via a LAN and without access to the Internet. Furthermore, in some embodiments the sink device 204a and the access point 206 may be combined into an integrated component.

As also illustrated in FIG. 2, any or all of the source device(s) 202 may optionally be coupled directly to the access point 206 to access the network 208, and the optional coupling between any source device 202 and the access point 206 may include one or more wired communication channels, and/or one or more wireless communication channels such as, for example, a WiFi communication channel, a Peer-To-Peer (P2P) communication channel (e.g., a BLUETOOTH® communication channel or Near Field Communication (NFC) channel), and/or any of a variety of other communication channels known in the art. However, in some embodiments, the optional connection between the source device(s) 202 and the access point 206 may be discarded, and the source device(s) 202 may be coupled to the access point 206 through the sink device 204a to access the network 208 as discussed below. Thus, while a specific embodiment of the layered content display system 200 is illustrated and described herein, one of skill in the art in possession of the present disclosure will recognize that a wide variety of modification to the components and configuration of the layered content display system 200 will fall within the scope of the present disclosure.

Figure 3:
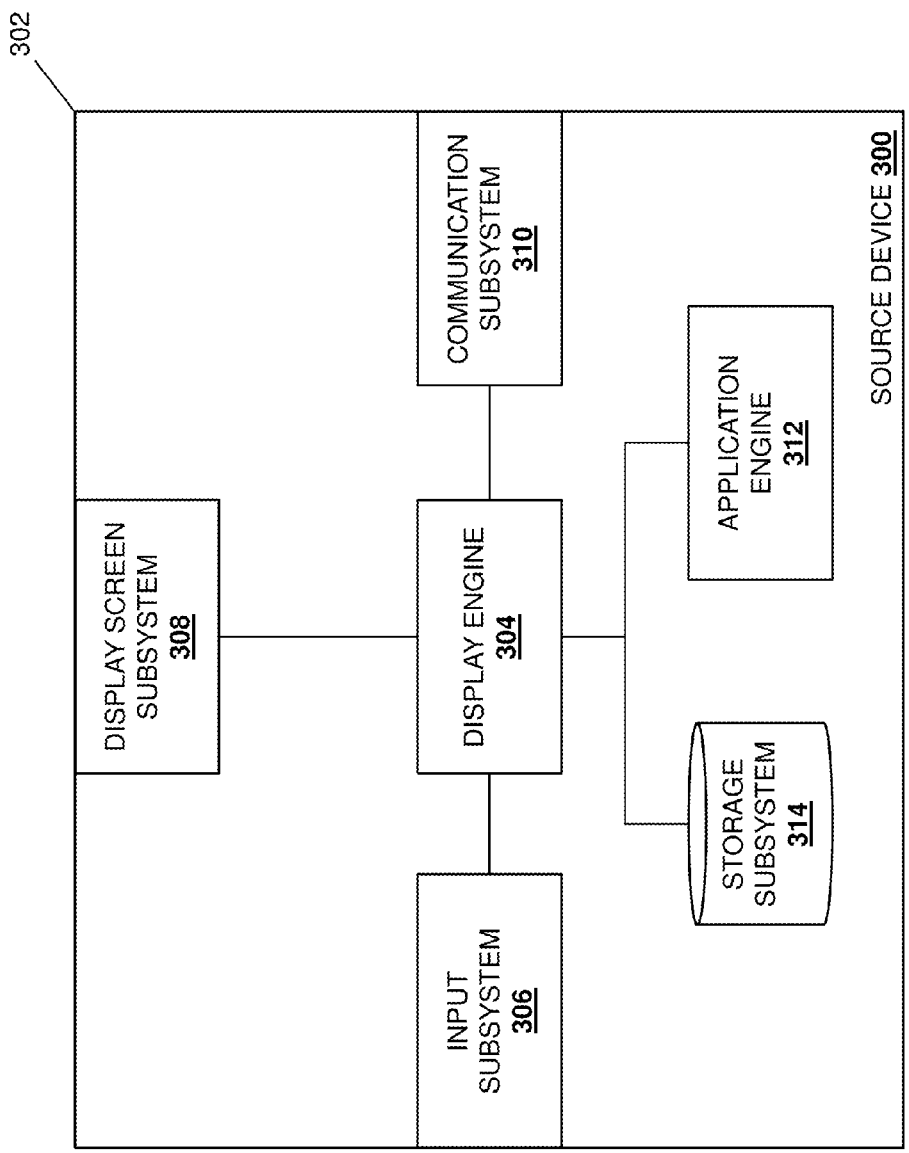
FIG. 3 is a schematic view illustrating an embodiment of a source device used in the layered content display system of FIG. 2.

Referring now to FIG. 3, an embodiment of a source device 300 is illustrated that may be any of the source device(s) 202 discussed above with reference to FIG. 2. As such, the source device 300 may be the IHS 100 discussed above with reference to FIG. 1, and/or may include some or all of the components of the IHS 100. As discussed above, while the source device 300 is described below as a mobile computing device such as a laptop/notebook computer device, tablet computing device, and mobile phone, the source device 300 may be provided by desktop computing devices, server computing devices, and/or a variety of other computing devices that would be apparent to one of skill in the art in possession of the present disclosure. In the illustrated embodiment, the source device 300 includes a chassis 302 that houses the components of the source device 300, only some of which are illustrated in FIG. 3. For example, the chassis 302 may house a processing system (not illustrated, but which may be provided by the processor 102 discussed above with reference to FIG. 1) and a memory system (not illustrated, but which may be provided by the memory 114 discussed above with reference to FIG. 1) that includes instructions that, when executed by the processing system, cause the processing system to provide a display engine 304 that is configured to perform the functions of the display engines and source devices discussed below. In a specific example, the processing system may include a graphics processing unit (GPU) that is configured to render at least a subset of content information for display as discussed below.

The chassis 302 also houses an input subsystem 306 that is coupled to the display engine 304 (e.g., via a coupling between the processing system and the input subsystem 306). In an embodiment, the input subsystem 306 may be provided by a keyboard input subsystem, a mouse input subsystem, a track pad input subsystem, a touch input display subsystem, and/or any other input subsystem known in the art. The chassis 302 also houses a display screen subsystem 308 that is coupled to the display engine 304 (e.g., via a coupling between the processing system and the display screen subsystem 308). In an embodiment, the display screen subsystem 308 may be provided by a display device that is integrated into the source device 300 and that includes a display screen (e.g., a display screen on a laptop/notebook computing device, a tablet computing device, or a mobile phone), or by a display device that is coupled directly to the source device 300 (e.g., a display device coupled to a desktop computing device by a cabled or wireless connection). The chassis 302 also houses a communication subsystem 310 that is coupled to the display engine 304 (e.g., via a coupling between the processing system and the communication subsystem 310). In an embodiment, the communication subsystem 310 may be provided by a wireless communication subsystem (e.g., a WiFi communication subsystem, a BLUETOOTH® communication subsystem, and/or other wireless communication subsystems known in the art), a network interface controller (NIC), and/or other communication subsystems known in the art.

In an embodiment, the memory system may also include instructions that, when executed by the processing system, cause the processing system to provide an application engine 312 that is configured to perform the functions of the application engines and source devices discussed below. The application engine 312 may provide any of a variety of applications known in the art on the source device 300, and may be configured to communicate with the display engine 304 as discussed below. In a specific example, the application engine 312 may provide an operating system for the source device, as well as particular applications used in the examples discussed below. The chassis 302 may also house storage device (not illustrated, but which may be the storage device 108 discussed above with reference to FIG. 1) that provides a storage subsystem 314 that is configured to store the content information discussed below, content information retrieval rules, as well as other data utilized by components (e.g., the application engine 312) in the source device 300. While a specific embodiment of the source device 300 is illustrated and described herein, one of skill in the art in possession of the present disclosure will recognize that a wide variety of modification to the components and configuration of the source device 300 will fall within the scope of the present disclosure.

Figure 4:
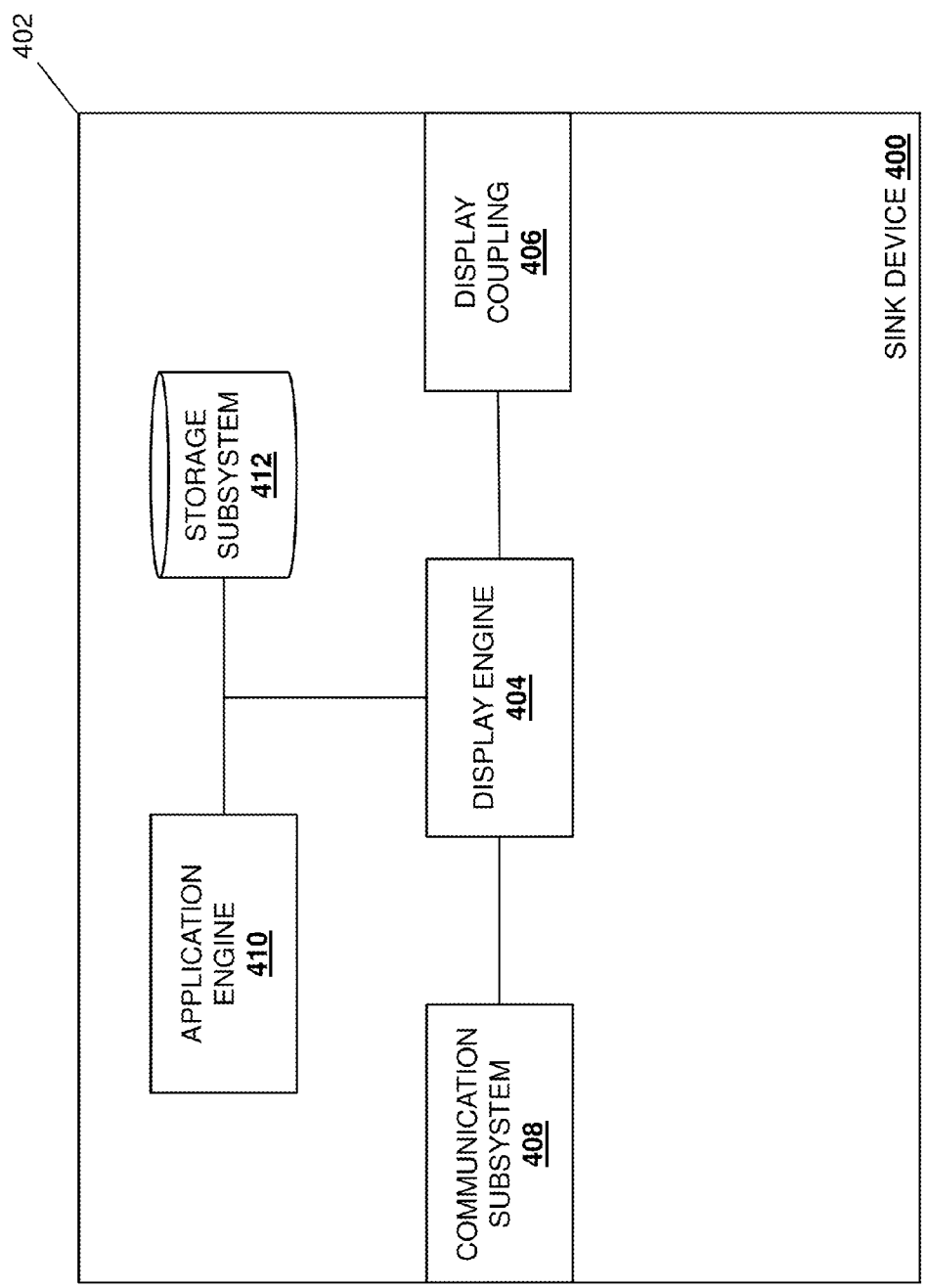
FIG. 4 is a schematic view illustrating an embodiment of a sink device used in the layered content display system of FIG. 2.

Referring now to FIG. 4, an embodiment of a sink device 400 is illustrated that may be the sink device 204a discussed above with reference to FIG. 2. As such, the sink device 400 may be the IHS 100 discussed above with reference to FIG. 1, and/or may include some or all of the components of the IHS 100. As discussed above, while the sink device 400 is described as at least part of a shared display system such as projector computing system, a dongle computing system, a television display system, and a content management display system, the sink device 400 may be provided by a variety of other computing devices that include display screens that may be utilized by one or more source device(s) as discussed below. In the illustrated embodiment, the sink device 400 includes a chassis 402 that houses the components of the sink device 400, only some of which are illustrated in FIG. 4. For example, the chassis 402 may house a processing system (not illustrated, but which may be provided by the processor 102 discussed above with reference to FIG. 1) and a memory system (not illustrated, but which may be provided by the memory 114 discussed above with reference to FIG. 1) that includes instructions that, when executed by the processing system, cause the processing system to provide a display engine 404 that is configured to perform the functions of the display engines and sink devices discussed below. In a specific example, the processing system may include a System on Chip (SoC) and/or a graphics processing unit (GPU) that is configured to render at least a subset of content information for display as discussed below.

The chassis 402 also houses a display coupling 406 that is coupled to the display engine 404 (e.g., via a coupling between the processing system and the display coupling 406). In an embodiment, the display coupling 406 may be provided by an external connector (e.g., that is configured to connect to the display device 204b via a display cable, configured to connect directly to an external connector on the display device 204b, etc.), an internal connector (e.g., between the processing system and the display device 204b that is integrated with the sink device 400), an image projection component (e.g., a projector lens), and/or a variety of other display couplings that would be apparent to one of skill in the art in possession of the present disclosure. The chassis 402 also houses a communication subsystem 408 that is coupled to the display engine 404 (e.g., via a coupling between the processing system and the communication subsystem 408). In an embodiment, the communication subsystem 408 may be provided by a wireless communication subsystem (e.g., a WiFi communication subsystem, a BLUETOOTH® communication subsystem, and/or other wireless communication subsystems known in the art), a network interface controller (NIC), and/or other communication subsystems known in the art.

In some embodiments, the memory system may also include instructions that, when executed by the processing system, cause the processing system to provide an application engine 410 that is configured to perform the functions of the application engines and sink devices discussed below. The application engine 410 may be configured to provide any of a variety of applications known in the art on the sink device 400, and may be configured to communicate with the display engine 404 as discussed below. For example, as discussed in further detail below, the application engine 410 in the sink device 400 may be configured to execute applications locally in the sink device 400 that are also being executed on a source device in order give the appearance of the "sharing" of those applications by the source device(s) on the display device 204b. The chassis 402 may also house a storage device (not illustrated, but which may be the storage device 108 discussed above with reference to FIG. 1) that provides a storage subsystem 412 that is configured to store the at least a subset of the content information discussed below, content information retrieval rules, as well as other data utilized by components (e.g., the application engine 410) in the sink device 400. While a specific embodiment of the sink device 400 is illustrated and described herein, one of skill in the art in possession of the present disclosure will recognize that a wide variety of modification to the components and configuration of the sink device 400 will fall within the scope of the present disclosure.

Figure 5:
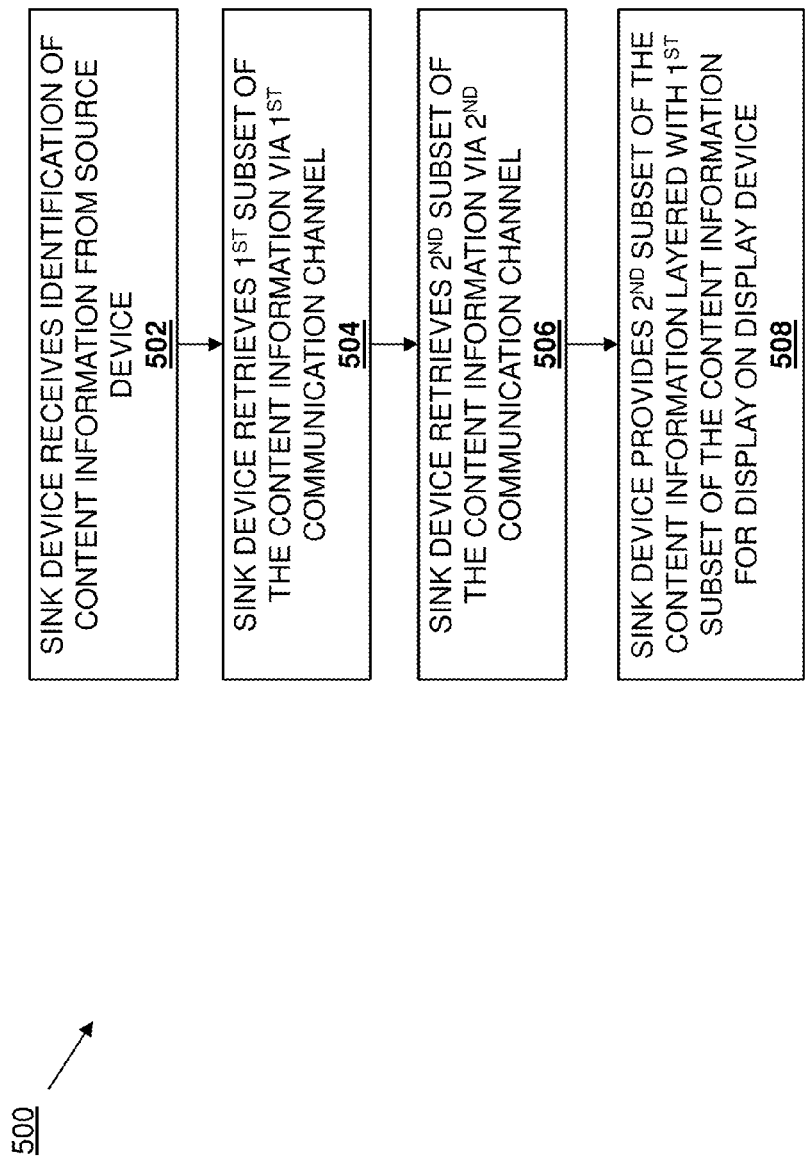
FIG. 5 is a flow chart illustrating an embodiment of a method for providing layered content for display.

Referring now to FIG. 5, an embodiment of a method 500 for providing layered content for display is illustrated. As discussed above, providing for the display of bandwidth intensive content such as media content at high resolutions and full color depth can create high latency in wireless display connections due to the significant amount of content information (e.g., pixel information) transmitted through the system, causing noticeable delays in the response of other content information such as input elements, and those latency issues can also result in visual artifacts, interrupted service, and link failures that further impact the user experience. The systems and methods of the present disclosure provide for the display of layered content information in which the source device(s) may identify content information to the sink device, and the sink device may retrieve a first subset of that content information via a first communication channel (e.g., a communication channel connected to the source) along with a second subset of that content information from a second communication channel (e.g., a communication channel connected to the Internet), and then overlay the first and second subsets of content information (while in some situations buffering at least one of the subsets of content information) in order to provide the content information for display on a display device in a manner that reduces the latency issues discussed above. This allows source device(s) to define a content area (e.g., its entire display screen, a portion of its display screen, an application provided for display on its display screen, etc.), and either or both of the source device and the sink device to determine how to retrieve content information in that content area for display on the display device that greatly reduces or eliminates the latencies and associated problems discussed above to improve the user experience associated with providing content from their source device to a display device via a sink device.

Figure 6:
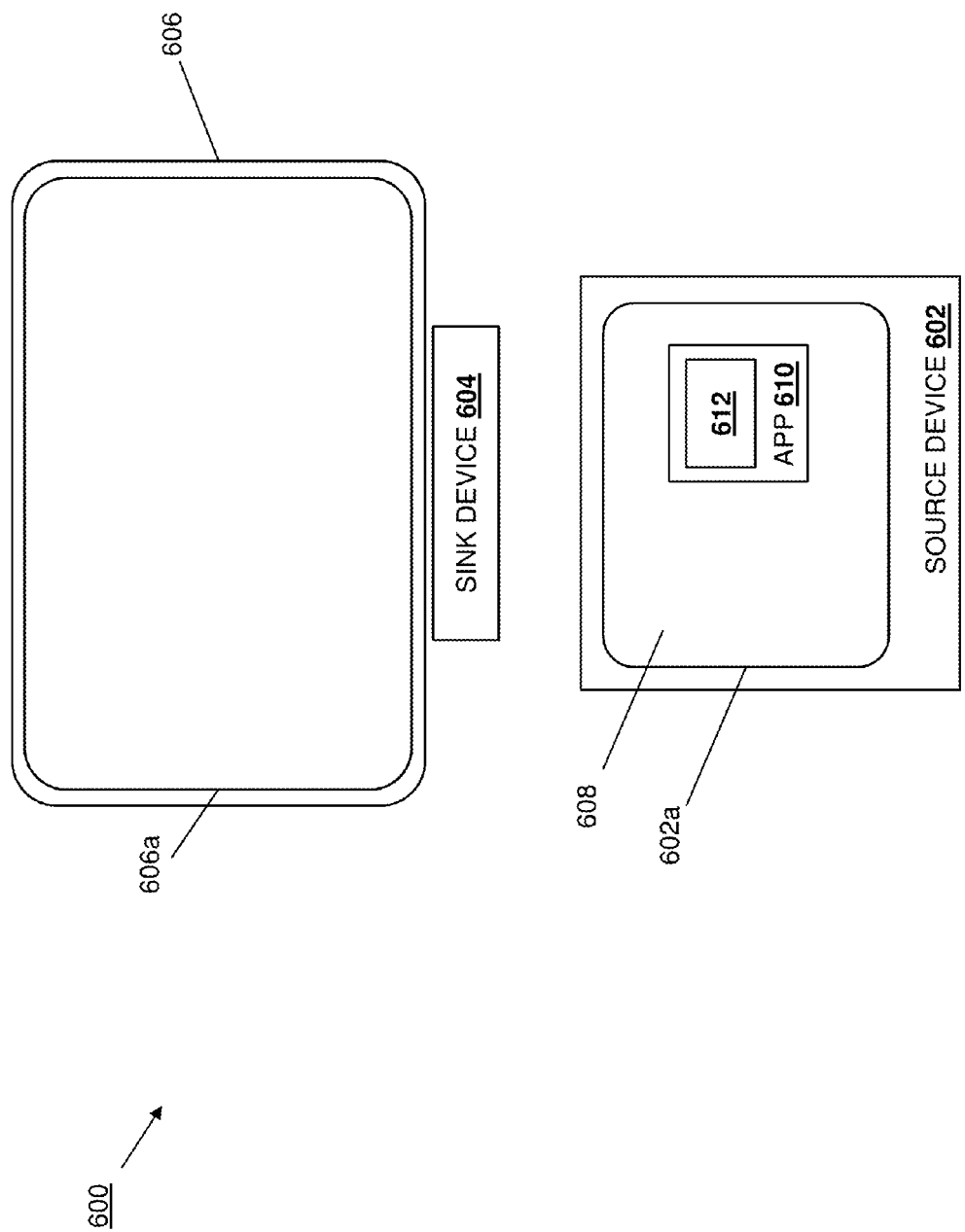
FIG. 6 is a schematic view illustrating an embodiment of a source device displaying content information.

The method 500 begins at block 502 where a sink device receives an identification of content information from a source device. In an embodiment, prior to the method 500, the source device 202 may connect to the sink device 204a. For example, the connection between any source device and the sink device 204a may be performed according to the teachings of U.S. patent application Ser. No. 15/274,426, filed on Sep. 23, 2016, and U.S. patent application Ser. No. 15/296,707, filed on Oct. 18, 2016, the disclosures of which are incorporated by reference in their entirety. In an embodiment, at block 502, the application engine 312 in the source device 300/202 may generate content information in the form of an operating system desktop, an application, and/or a variety of other types of content information known in the art, and the display engine 304 may detect that content information and send an identification of that content information through the communication subsystem 310 to the sink device 204a. The display engine 404 in the sink device 204a/400 may then receive that identification though the communication subsystem 408 at block 502. In different embodiments, the identification of content information at block 502 may be performed in a variety of manners and may include a variety of different information related to the content information. Referring now to FIG. 6, an embodiment of a layered content display system 600 is illustrated that is substantially similar to the layered content display system 200 discussed above and that includes a source device 602 having a source device display screen 602a, a sink device 604, and a display device 606 having a display screen 606a. In the illustrated embodiment, the application engine 312 in the source device 602 is operating to provide content information on the source device display screen 602 that includes an operating system desktop 608, along with an application 610 (e.g., an Internet browser) that includes Internet content 612. However, one of skill in the art in possession of the present disclosure will recognize that any of a variety of content information may be provided by the source device 602 while remaining within the scope of the present disclosure.

In one embodiment of the identification of content information at block 502, the application engine 312 in the source device 300/602 may operate to identify the entire source device display screen 602a as the content information. For example, the display engine 304 may provide a Graphical User Interface (GUI) that allows the user of the source device 300/602 to identify content information to the sink device 204a/604, and an option on that GUI to identify or "share" the entire screen (e.g., all of the content information provided for display on the source device display screen 602a such as the operating system desktop 608 and the application 610 with the Internet content 612) may be selected by the user. In some embodiments, a user choosing to share the entire source device display screen 602a may be given the option to select portions of the content information provided for display on the source device display screen 602a to remove those portions from the content information that is identified at block 502 (e.g., to prevent from sharing those portions of the content information). For example, a user choosing to share the entire source device display screen 602a may select the application 610 to allow for identification of the operating system desktop 608 as content information at block 502 without including the application 610 providing the Internet content 612 as part of that content information (that will later be shared on the display device 204b as discussed below.)

In another embodiment of the identification of content information at block 502, the application engine 312 in the source device 300/602 may operate to identify applications that are being provided for display on the source device display screen 602a as the content information. For example, the display engine 304 may provide the Graphical User Interface (GUI) that allows the user of the source device 300/602 to identify content information to the sink device 204a/604, and an option on that GUI to identify or "share" one or more applications (e.g., the application 610 including the Internet content 612) may be selected by the user along with the selection of an application (e.g., by selecting any portion of the application displayed on the source device display screen 602a). In some embodiments, a user choosing to share an application may be given the option to select portions of the application that are provided for display on the source device display screen 602a to remove those portions from the content information that is identified at block 502 (e.g., to prevent from sharing those portions of the content information). For example, a user choosing to share an Internet browser application that includes a plurality of different Internet browser tabs may select one or more of the Internet browser tabs on the Internet browser application to allow for identification of the Internet browser as content information at block 502 without including the selected Internet browser tab(s) as part of that content information (that will later be shared on the display device 204b as discussed below.)

Figure 7:
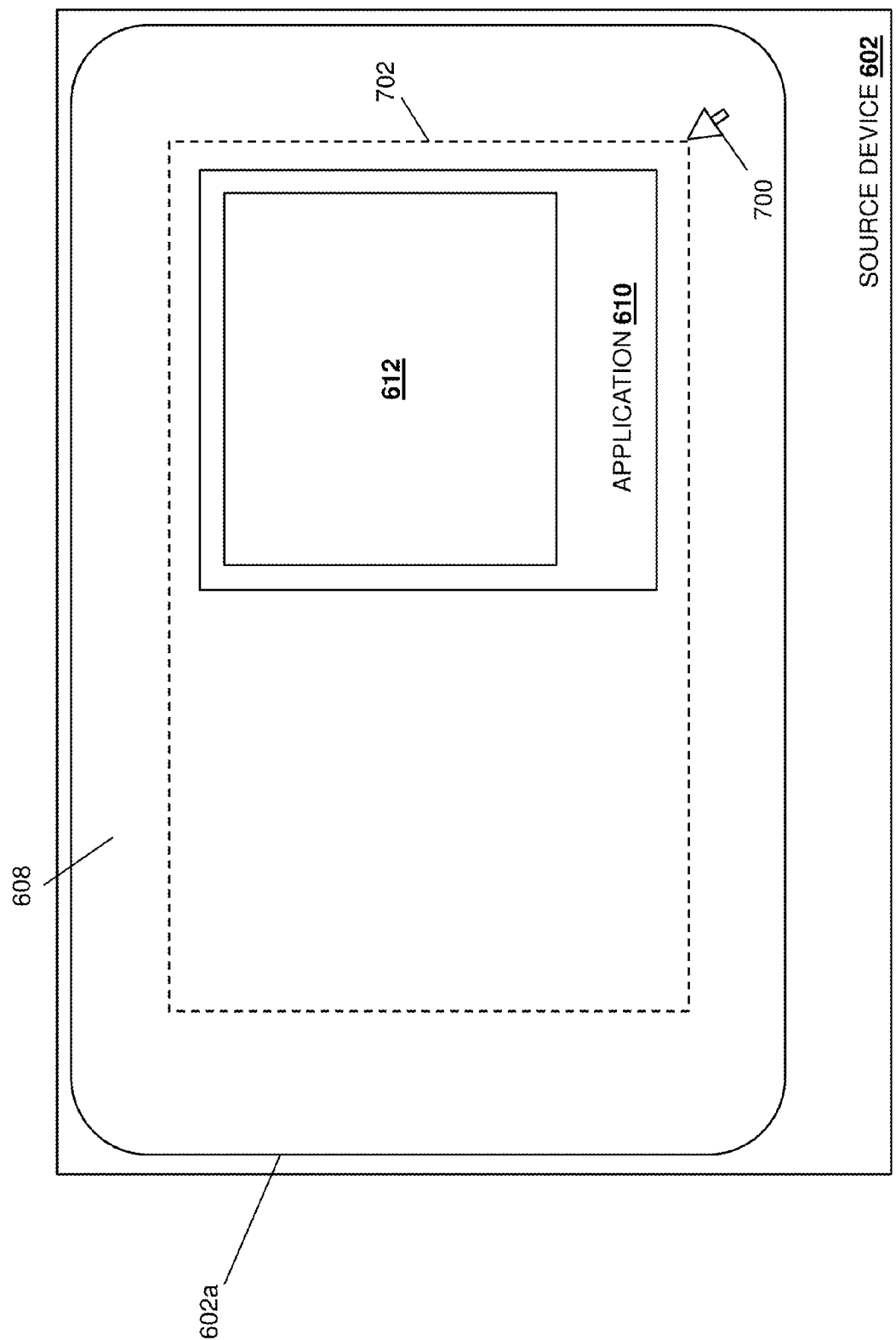
FIG. 7 is a screen shot illustrating an embodiment of the source device of FIG. 6 defining a content information display window including the content of FIG. 6.

In yet another embodiment of the identification of content information at block 502, the application engine 312 in the source device 300/602 may operate to identify a portion of the source device display screen 602a as the content information. Referring now to FIG. 7, an example of the identification of a portion of the source device display screen 602a as the content information is illustrated. For example, the display engine 304 may provide the Graphical User Interface (GUI) that allows the user of the source device 300/602 to identify content information to the sink device 204a/604, and an option on that GUI to identify or "share" a portion of the screen may be selected by the user. Following that selection, the user may utilize the input subsystem 306 (e.g., a mouse) to manipulate an input element 700 to define a content information area 702 on the source device display screen 602a that identifies the portion of the source device display screen 602a (e.g., including a portion of the operating system desktop 608 as well as the application 610 including the Internet content 612 in this example) that will be identified to the sink device 204a/604 as content information at block 502. In some embodiments, a user choosing to share a portion of the source device display screen 602a may be given the option to select sub-portions of that content information that is provided for display on the source device display screen 602a to remove those sub-portions from the content information that is identified at block 502 (e.g., to prevent from sharing those sub-portions of the content information). For example, a user choosing to share the content information included in the content information area 702 on the source device display screen 602a may select the application 610 to allow for identification of the portion of the operating system desktop 608 in the content information area 702 as content information at block 502 without including the application 610 providing the Internet content 612 as part of that content information (that will later be shared on the display device 204b as discussed below.)

As discussed above, in some embodiments the identification of content information at block 502 may include a variety of different information related to the content information. In one embodiment, the identification of content information may include the source device 202/602 determining content retrieval information and providing the content retrieval information to the sink device 204b/604. For example, the display engine 304 in the source device 204a/300 may be configured (e.g., using content retrieval rules, instructions, or other data stored in the storage subsystem 314) to determine content retrieval information that may define (or help to define) how the content information should be retrieved by the sink device 204b/604. Content retrieval rules for determining content retrieval information may include rules that define latency based on the content information, rules that define latency levels of communication channels, rules for testing the latency of communication channels, and/or any other rules or information that allow for the determination of subsets of content information, communication channels through which to retrieve those subsets of content information, and/or any other data that may be utilized by the sink device to reduce latency via the display of the layered content as discussed below.

In a specific example using FIG. 7, the content retrieval information may define different subsets of the identified content information such as, for example, the operating system desktop 608 (or portion thereof included in the content information) as a first subset of the identified content information, the application 610 (e.g., the GUI elements of the application 610 other than the Internet content 612) as a second subsystem of identified content information, and the Internet content 612 as a third subsystem of the identified content information. Furthermore, the content retrieval information may define different communication channels for the retrieval of identified content information such as, for example, a first P2P communication channel (e.g., an NFC communication channel) for retrieval of the first subset of the identified content information (e.g., the operating system desktop 608), a second P2P communication channel (e.g., a BLUETOOTH® communication channel) for retrieval of the second subset of the identified content information (e.g., the GUI elements of the application 610 other than the Internet content 612), and a network communication channel (e.g., a WiFi communication channel) for retrieval of the third subset of the identified content information (e.g., the Internet content 612). Furthermore, as discussed below, content retrieval information may identify more than one communication channel for any particular subset of content information (e.g., more than one communication channel for retrieval of the Internet content 612).

In some embodiments, the determination of content retrieval information may be performed solely, or at least in part, by the sink device 204b/604, rather than, or in cooperation with, the source device 202/602. For example, after receiving the identification of the content information from the source device 202/602 at block 502, the display engine 404 in the sink device 204b/400 may be configured (e.g., using content retrieval rules, instructions, or other data stored in the storage subsystem 314) to determine content retrieval information that may define (or help to define) how the content information should be retrieved by the sink device 204b/400, similarly as discussed above for the source device 202/602. As such, following block 502, the source device 202 has identified content information to the sink device 204a, and either or both of the source device 202 and the sink device 204b has operated to determine different subsets of that content information, communication channel(s) through which to retrieve those subsets of that content information, and/or any other information necessary to provide the functionality discussed below.

The method 500 then proceeds to block 504 where the sink device retrieves a first subset of the content information via a first communication channel, and to block 506 where the sink device retrieves a second subset of the content information via a second communication channel. While the embodiment of the method 500 in FIG. 5 is illustrated as only including retrieval of a first and second subset of identified content information via respective first and second communication channels, one of skill in the art in possession of the present disclosure will appreciate that any number of subsets of the identified content information may be determined and retrieved over one or more communication channels while remaining within the scope of the present disclosure.

Figure 8A:
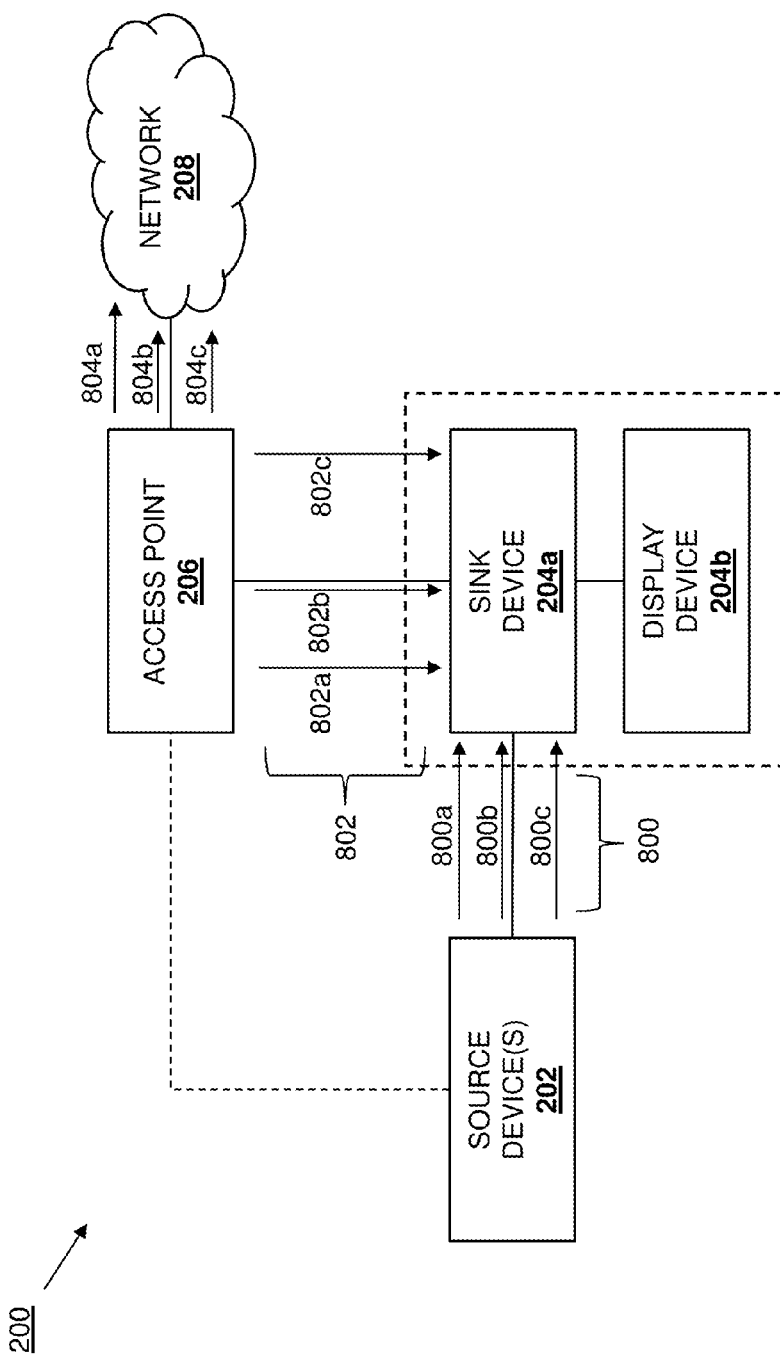
FIG. 8a is a schematic view illustrating an embodiment of the retrieval of subsets of content information by a sink device.

Referring now to FIG. 8a, an embodiment of the retrieval of the first subset and the second subset of content information via respective first and second communication channels is illustrated. At block 504 the display engine 404 in the sink device 204a may operate according to the content retrieval information to retrieve the first subset of the content information from the source device 202 via at least one communication channel 800. Continuing with the example above, the source device 202 may be coupled to the sink device 204a via an NFC communication channel, and at block 504 the display engine 404 in the sink device 204a/400 may utilize the communication subsystem 408 to retrieve the operating system desktop 608 from the source device 202 (e.g., via its display engine 304 and communication subsystem 308) via the NFC communication channel. Furthermore, as illustrated in FIG. 8a, in some embodiments the one or more subsets of the content information may be retrieved from the source device via multiple communication channels 800a, 800b, and up to 800c. For example, the communication channels 800a, 800b, and up to 800c may be different communication channels of the same communication technology (e.g., different NFC communication channels) or different communication channels of different communication technologies (e.g., an NFC communication channel, a BLUETOOTH® communication channel, and a WiFi communication channel (e.g., as provided by the access point 206, via a WiFi direct connection between the source device 202 and the sink device 204a, etc.), and may be used to retrieve the first subset of the content information. As such, different portions of the operating system desktop 608 may be retrieved over the communication channels 800a, 800b, and up to 800c. In another example, different subsets of the content information from the same source device (e.g., the operating system desktop 608, as well as the GUI elements of the application 610 other than the Internet content 612) may be retrieved through one or more of the communication channels 800a, 800b, and 800c.

At block 506 the display engine 404 in the sink device 204a may operate according to the content retrieval information to retrieve the second subset of the content information from the network 208 via at least one communication channel 802 with the access point 206. Continuing with the example above, the source device 202 may be coupled to the access point 206 via a WiFi communication channel, and at block 506 the display engine 404 in the sink device 204a/400 may utilize the communication subsystem 408 to retrieve the Internet content 612 from the network 208 via the WiFi communication channel 802 with the access point 206. Furthermore, as illustrated in FIG. 8a, in some embodiments the second subset of the content information may be retrieved from the network via multiple communication channels 802a, 802b, and up to 802c with the access point 206. For example, the communication channels 802a, 802b, and up to 802c may be different communication channels of the same communication technology (e.g., different WiFi communication channels) or different communication channels of different communication technologies (e.g., an NFC communication channel, a BLUETOOTH® communication channel, and a WiFi communication channel). As such, different portions of the Internet content 612 may be retrieved over the communication channels 802a, 802b, and up to 802c.

As also illustrated in FIG. 8a, in some embodiments, the access point 206 may operate to provide the second subset of content information to the sink device 204a by retrieving that second subset of content information via multiple communication channels 804a, 804b, and up to 804c. For example, in some embodiments the content retrieval information determined by any or all of the source device 202, the sink device 204a, and the access point 206 may specify communication channel(s) through which the access point 206 should retrieve subset(s) of the content information, and at block 506 the access point may operate according to that content retrieval information to retrieve the subset(s) of content information through the network 208 via those communication channels(s), and provide those subset(s) of content information to the sink device 204a via the communication channel(s) 802. In an embodiment, the access point 206 may operate to retrieve the second subset of the content information from different locations available through the network 208 such as, for example, different content provider sites available through the Internet at different addresses, different source devices reachable through a LAN, combinations thereof, etc., and then provide that second subset of content information to the sink device 204a via the communication channel(s) 800. Similarly, in some embodiments, the access point 206 may operate to retrieve different subsets of the content information from different locations available through the network 208, and then provide those different subsets of content information to the sink device via the communication channel(s) 800.

The method 500 then proceeds to block 508 where the sink device provides the second subset of the content information layered with the first subset of the content information for display on the display device. In an embodiment, the display engine 404 in the sink device 204a/400 operates at block 508 to provide the first and second subset of the content information through the display coupling 406 to the display device 204b, with the second subset of the content information layered with the first subset of the content information such that the display of the content information on the display screen of the display device 204b is substantially similar to the display of the content information on the source device display screen of the source device 202. For example, layering at block 508 may include the sink device 608 retrieving the data included in the first content information from the source device 602 and rendering a first content layer, retrieving the data included in the second content information from the Internet and rendering a second content layer, and then integrating the first content layer and the second content layer using relative positioning data received from the source device 602. In addition, the layering of the subsets of the content information may be accompanied by the sink device 608 operating to buffer at least one of the subsets of content information while overlaying at least one other subset of content information in order to provide for the display of the content information on the display screen of the display device 204b is substantially similar to the display of the content information on the source device display screen of the source device 202.

As discussed above, in some embodiments the user of the source device 602 may have identified content information at block 502 that is provided for display on the entire source device display screen 602a of the source device 602, and the sink device 608 may provide different subsets of that content information that have been retrieved via different communication channels on the entire display screen 606a of the display device 606 (e.g., where that content information is displayed "full screen" on the display screen 606a), or on a portion of the display screen 606a of the display device 606 (e.g., where that content information is displayed in a section of the display screen 606a dedicated to the source device 602.) As also discussed above, in some embodiments the user of the source device 602 may have identified content information at block 502 that is provided by only the application 610 including the Internet content 612 displayed on the source device display screen 602a of the source device 602, and the sink device 608 may provide different subsets of that content information that have been retrieved via different communication channels on the entire display screen 606a of the display device 606 (e.g., where that content information is displayed "full screen" on the display screen 606a), or on a portion of the display screen 606a of the display device 606 (e.g., where that content information is displayed in a section of the display screen 606a dedicated to the source device 602.)

Figure 8B:
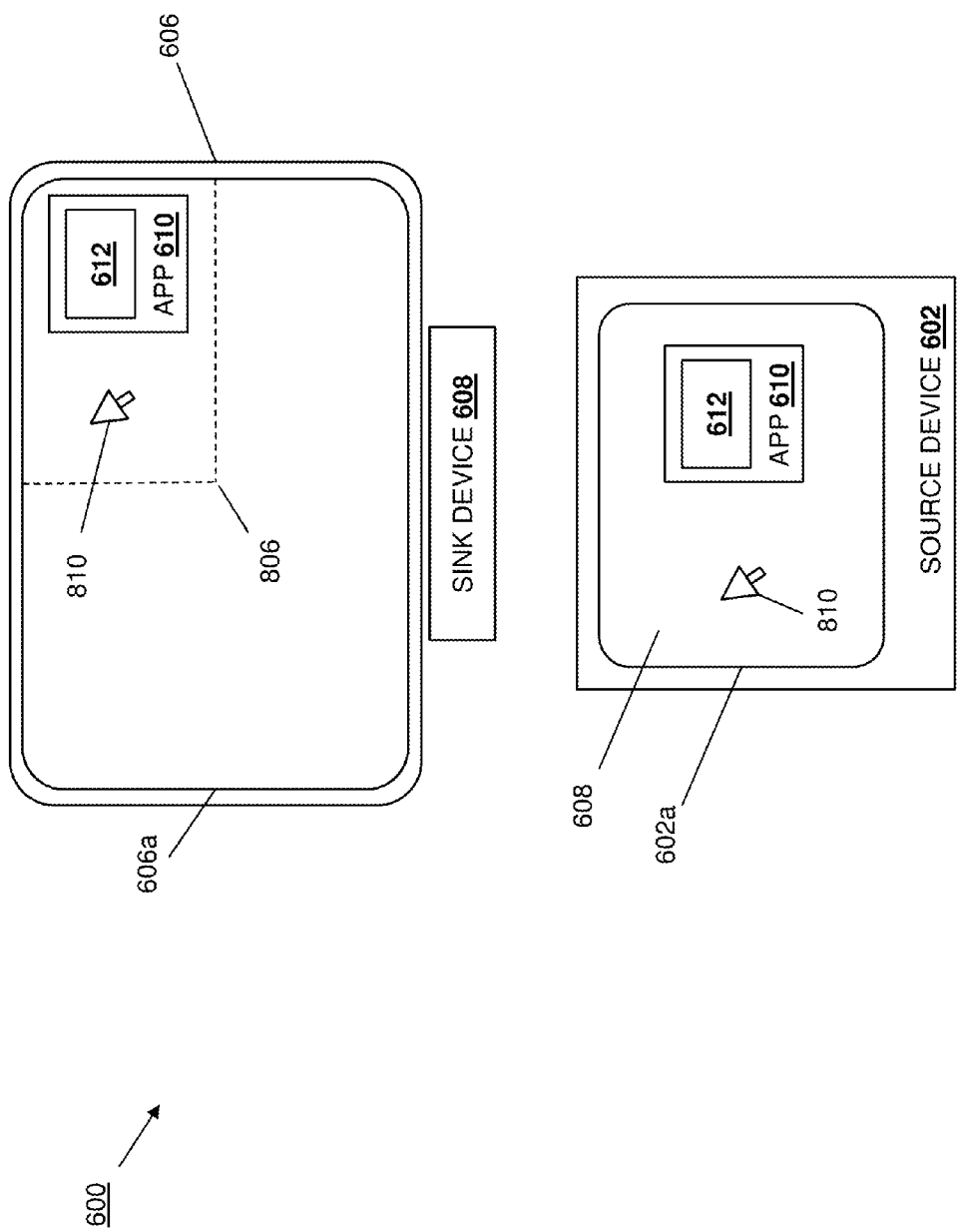
FIG. 8b is a schematic view illustrating an embodiment of the sink device displaying the content information identified by the source device in FIG. 7.

As also discussed above, in some embodiments the user of the source device 602 may have identified content information at block 502 that is provided by a defined portion of the source device display screen 602a of the source device 602, and the sink device 608 may provide different subsets of that content information that have been retrieved via different communication channels on the entire display screen 606a of the display device 606 (e.g., where that content information is displayed "full screen" on the display screen 606a), or on a portion of the display screen 606a of the display device 606 (e.g., where that content information is displayed in a section of the display screen 606a dedicated to the source device 602.) For example, with reference to FIG. 8b, the sink device 608 may provide a content information section 806 of the display screen 606a on the display device 606 that is dedicated for the content information provided by the source device 602, and the different subsets of the content information may be layered such that the content information displayed in the content information section 806 is substantially similar to the display of the content information on the source device display screen 602a of the source device 602 (e.g., the application 610 including Internet content 612 layered with the portion of the operating system desktop 608 that is included in the content information area 702 in the illustrated example). Furthermore, as also illustrated in FIG. 8b, as content information changes, that changing content information may be provided to the sink device 204a/608 for display on the display device 606. For example, the user may move an input element 810 into a portion of the source device display screen 602a that was identified as content information, causing the sink device 204a/608 to retrieve the subset of the content information that includes the input element 810 and reproduce it in the content information section 806 on the display screen 606a of the display device 606 (layered with the other subsets of content information.) As such, as identified content information changes, it is updated for display on the display screen 606a of the display device 606 via the content retrieval functionality discussed above.

One of skill in the art in possession of the present disclosure will recognize how the method 500 may be performed with different source device such those source devices identify respective content information, the sink device retrieves different subsets of each respective content information via different communication channels, and the sink device layers those different subsets of each respective content information for display on the display screen 606a of the display device 606. For example, in one embodiment, FIG. 9 illustrates the sink device 608 providing the content information section 806 of the display screen 606a on the display device 606 that is dedicated for the content information identified by the source device 602 and that includes the different subsets of the content information layered such that the content information displayed in the content information section 806 is substantially similar to the display of the content information on the source device display screen 602a of the source device 602, as discussed above. In addition, the sink device 608 is also providing other content information (e.g., "second content information" that includes the application 900 in the illustrated example) for display on the display screen 606a of the display device 606 that may have been identified by a source device that is different from the source device 602 (e.g., a "second" source device), and that second content information may include different subsets that have been layered by the sink device 608 in substantially the same manner as discussed above such that the second content information is displayed on the display screen 606a of the display device 606 substantially similarly to the display of the second content information on the second source device.

However, in some embodiments, FIG. 9 illustrates a sink device displaying different content identified by the same source device. For example, FIG. 9 illustrates the sink device 608 providing the content information section 806 of the display screen 606a on the display device 606 that includes the content information provided by the source device 602 with the different subsets of the content information retrieved via the different communication channels layered such that the content information displayed in the content information section 806 is substantially similar to the display of the content information on the source device display screen 602a of the source device 602, as discussed above. In addition, the sink device 608 may also provide additional content information (e.g., "second content information" that includes the application 900 in the illustrated example) for display on the display screen 606a of the display device 606 that may have been identified by the source device 602 as well. FIG. 9 illustrates how a source device in the layered content display system 200/600 may identify content information that is not being displayed on the source device display screen 602a of the source device 600, and have the sink device 608 retrieve that content information and provide it for display on the display screen 606a of the display device 606. For example, an embodiment of the situation illustrated in FIG. 9 may include the sink device 608 providing for the sharing of a portion of the source device display screen 602a of the source device 602 via the display device 606, as well as running an application 900 (which is not displayed on the source device display screen 602a) that is displayed on the display device 606 at the instruction of the source device 602.

In some examples, the second content information (e.g., the application 900) provided for display on the display screen 606a of the display device 606 may include different subsets that have been retrieved via different respective communication channels and layered by the sink device 608 in substantially the same manner as discussed above. However, in other embodiments, first content information provided in the content information section 806 on the display screen 606a of the display device 606 (e.g., the shared portion of the source device display screen 602a) may be retrieved by the sink device 608 via a first communication channel (e.g., a P2P connection with the source device 602), while second content information provided on the display screen 606a of the display device 606 adjacent the content information section 806 (e.g., the application 900) may be retrieved by the sink device 608 via a second communication channel (e.g., WiFi connection through the access point 206 to the network 208). As such, the identification of content information to the sink device, and subsequent retrieval and display of content information by the sink device, may be performed in a variety of manners that are envisioned as falling within the scope of the present disclosure.

Thus, systems and methods have been described that provide for the identification of content information by one or more source device to a sink device, the retrieval of different subsets of that content information via different communication channels by the sink device, and the layering of those different subsets of content information and display of that layered content information on a display device. One of skill in the art in possession of the present disclosure will recognize that the content information provided by one or more source devices may be divided into subsets that may then be retrieved via respective communication channels, and then layered for display on a display device in a manner reduces latency in the display of the content information that can produce input element delays, visual artifacts, interruption of service, and link failure by, for example, merging a subset of content information retrieved via an Internet connection with display data content information retrieved from a source device to provide a single data stream to the sink device that receives the greatest amount of information for display in the system.

Furthermore, in some embodiments, the sink device may be configured to prioritize source devices and/or the content information identified by those source devices so that any possible latency issues will effect low priority source devices and/or low priority content information before they effect high priority source devices and/or high priority content information. Furthermore, the sink device may categorize subsets of content information to minimize perceived latency by, for example, allowing for buffering of less time critical content information (e.g., a video stream in Internet content retrieved via the Internet) while prioritizing input element content information (e.g., a mouse input element retrieved via a P2P connection with a source device). Additional benefits may be realized by implementing a dynamic power control subsystem on the source devices that reduces the amount of power used to maintain communication channels with the sink device, which can result in the reduction of wireless communication channel "noise" in the area around paired/linked devices (e.g., the source device may operate in a low power state to communicate with the sink device (and through the sink device to the access point to the Internet) relative to a higher power state that is needed to communicate directly with the access point. This may provide particular benefits when many source devices wirelessly connect directly through their sink devices to the Internet (e.g., via a sink device/Internet wired connection) rather than all operating in a high power state to simultaneously dock and connect to the Internet through a common access point.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A layered content display system, comprising:
   a networking device that is coupled to a network;
   a source device that is configured to display first content information on a source device screen;
   a display device; and
   a sink device that is coupled to the networking device, the source device, and the display device, wherein the sink device is configured to:
      receive, from the source device, an identification of the first content information;
      retrieve, directly from the source device via a first communication channel, a first subset of the first content information that is being displayed on the source device screen;
      retrieve, through the networking device from the network via a second communication channel that is different than the first communication channel, a second subset of the first content information that is being displayed on the source device screen such that none of the second subset of the first content information is retrieved from the source device;
      buffer the second subset of the first content information while overlaying the first subset of the first content information and the second subset of the first content information; and provide, for display on the display device, the second subset of the first content information layered with the first subset of the first content information such that the display of the first content information on the display device is substantially similar to the display of the first content information when displayed on the source device screen.

2. The system of claim 1, wherein the source device is coupled to the network through a first connection to the sink device and a second connection between the sink device and the networking device.

3. The system of claim 1, wherein sink device is coupled to the source device via a peer-to-peer connection, and wherein the sink device is coupled to the networking device via a WiFi connection.

4. The system of claim 1, wherein the sink device is configured to:
receive, from the source device, a content information area that is associated with the source device screen, along with content retrieval information defining the first subset of the content information and the second subset of the content information.

5. The system of claim 1, wherein the sink device is configured to:
receive, from the source device, an identification of content information that is not being displayed in the source device screen of the source device and, in response, retrieve the content information that is not being displayed on the source device; and
provide the content information that is not being displayed in the source device display screen for display in the display device.

6. The system of claim 1, wherein the source device is a first source device, and wherein the sink device is configured to:
receive, from the first source device, an identification of second content information;
retrieve, from the first source device, a first subset of the second content information;
retrieve, from a second source device, a second subset of the second content information; and
provide, for display on the display device, the second subset of the second content information layered with the first subset of the second content information.

7. The system of claim 1, wherein the sink device is configured to:
prioritize the display of the second subset of the first content information over the first subset of the first content information.

8. An information handling system (IHS), comprising:
a communication system;
a processing system that is coupled to the communication system; and
a memory system that is coupled to the processing system and that includes instructions that, when executed by the processing system, cause the processing system to provide a display engine that is configured to:
receive, from a source device, an identification of first content information that is being displayed on a source device screen coupled to the source device;
retrieve, directly from the source device via a first communication channel, a first subset of the first content information that is displayed on the source device screen;
retrieve, through a network via a second communication channel that is different than the first communication channel, a second subset of the first content information that is being displayed on the source device screen such that none of the second subset of the first content information is retrieved from the source device;
buffer the second subset of the first content information while overlaying the first subset of the first content information and the second subset of the first content information; and
provide, for display on a display device, the second subset of the first content information layered with the first subset of the first content information such that the display of the first content information on the display device is substantially similar to the display of the first content information when displayed on the source device screen.

9. The IHS of claim 8, wherein the source device is coupled to the network through the communication system.

10. The IHS of claim 8, wherein communication system provides a peer-to-peer connection to the source device, and a WiFi connection to the network.

11. The IHS of claim 8, wherein the display engine is configured to:
receive, from the source device, a content information area that is associated with the source device screen, along with content retrieval information defining the first subset of the content information and the second subset of the content information.

12. The IHS of claim 8, wherein the display engine is configured to:
receive, from the source device, an identification of content information that is not being displayed on the source device screen of the source device and, in response, retrieve the content information that is not being displayed on the source device; and
provide the content information that is not being displayed on the source device display screen for display on the display device.

13. The IHS of claim 8, wherein the source device is a first source device, and wherein the display engine is configured to:
receive, from the first source device, an identification of second content information;
retrieve, from the first source device, a first subset of the second content information;
retrieve, from a second source device, a second subset of the second content information; and
provide, for display on the display device, the second subset of the second content information layered with the first subset of the second content information.

14. The IHS of claim 8, wherein the display engine is configured to:
prioritize the display of the second subset of the first content information over the first subset of the first content information.

15. A method for providing layered content for display, comprising:
receiving, by a sink device from a source device, an identification of first content information that is being displayed on a source device screen coupled to the source device;
retrieving, by the sink device directly from the source device via a first communication channel, a first subset of the first content information that is being displayed on the source device screen;
retrieving, by the sink device through a network via a second communication channel that is different than the first communication channel, a second subset of the first content information that is being displayed on the source device screen such that none of the second subset of the first content information is retrieved from the source device;

buffering, by the sink device, the second subset of the first content information while overlaying the first subset of the first content information and the second subset of the first content information; and providing, by the sink device for display on a display device, the second subset of the first content information layered with the first subset of the first content information such that the display of the first content information on the display device is substantially similar to the display of the first content information when displayed on the source device.

16. The method of claim 15, wherein the source device is coupled to the network through a first connection to the sink device and a second connection between the sink device and a networking device.

17. The method of claim 15, wherein sink device is coupled to the source device via a peer-to-peer connection, and wherein the sink device is coupled to the networking device via a WiFi connection.

18. The method of claim 15, further comprising:
receiving, by the sink device from the source device, a content information area that is associated with the source device screen, along with content retrieval information defining the first subset of the content information and the second subset of the content information.

19. The method of claim 15, wherein the source device is a first source device, and wherein the method further comprises:
receiving, by the sink device from the first source device, an identification of second content information;
retrieving, by the sink device from the first source device, a first subset of the second content information;
retrieving, by the sink device from a second source device, a second subset of the second content information; and
providing, by the sink device for display on the display device, the second subset of the second content information layered with the first subset of the second content information.

20. The method of claim 15, further comprising:
prioritizing, by the sink device, the display of the second subset of the first content information over the first subset of the first content information.

* * * * *